June 23, 1959  P. KAUFMAN  2,891,727
ANALOGUE COMPUTER
Filed May 4, 1955
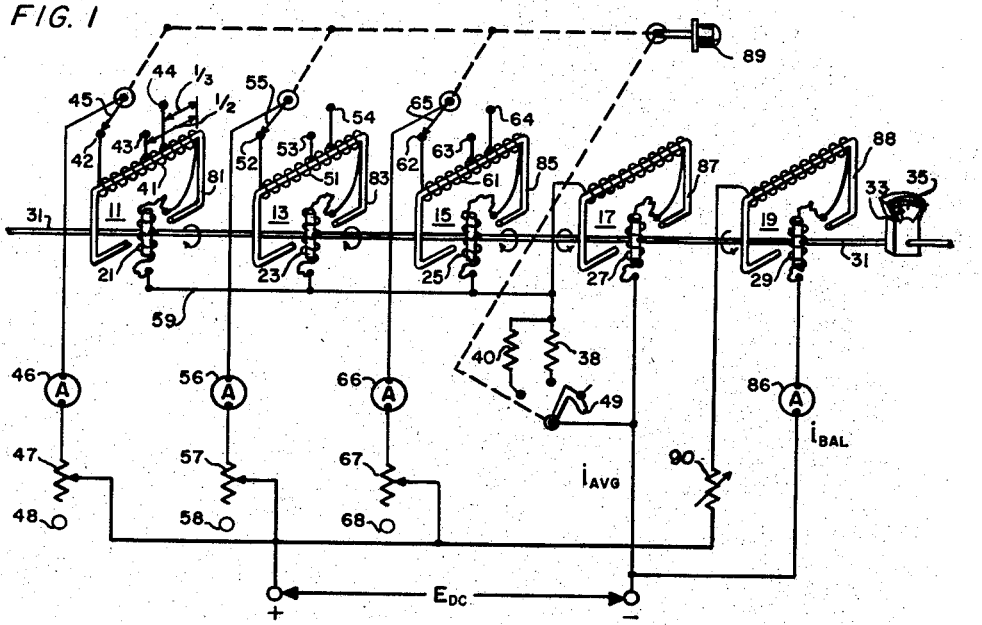
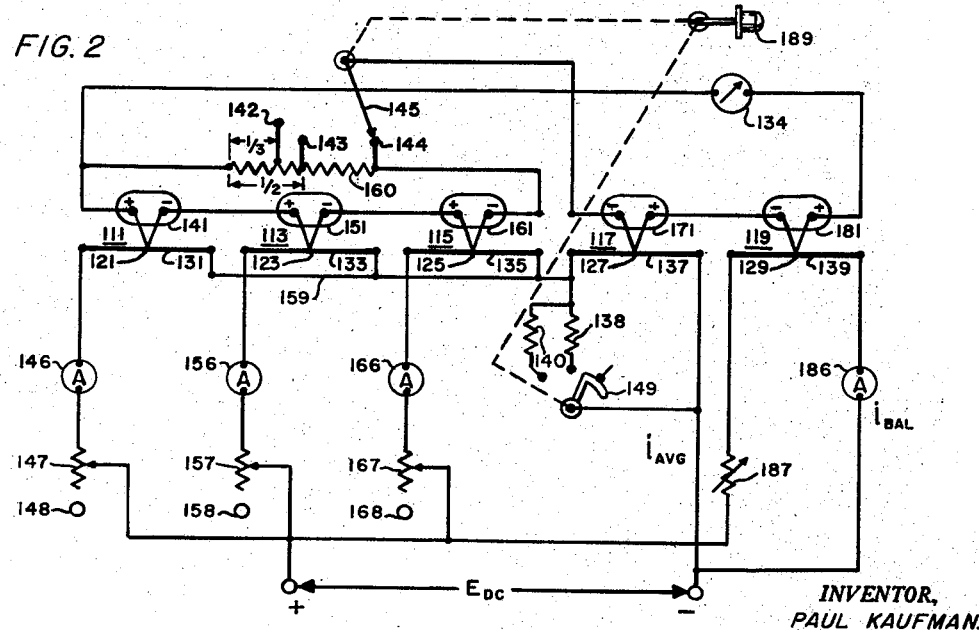
INVENTOR,
PAUL KAUFMAN.
BY
Harry M. Saragovitz
ATTORNEY United States Patent Office 2,891,727
Patented June 23, 1959

2,891,727
ANALOGUE COMPUTER
Paul Kaufman, Deal, N.J.

Application May 4, 1955, Serial No. 506,097

14 Claims. (Cl. 235—193)

(Granted under Title 35, U.S. Code (1952), sec. 266)

The invention described herein may be manufactured and used by or for the Government for governmental purposes without the payment of any royalty thereon.

This invention relates to computing apparatus and particularly to such apparatus which will automatically compute the standard deviation of a given set of numerical values. In this apparatus any one of several physical analogs may be used as a basis, provided individual voltages, or forces, are developed which are proportional to the square of individual current values. The resultant voltages, or forces, are added algebraically and balanced against a measuring voltage, or force, in a sensitive detector. The current required to balance the algebraic sum of the individual voltages, or forces, so as to produce a null balance in the detector, is a measure of the standard deviation of the given set of numerical values.

The principal object of the present invention is to provide an analog computer circuit for automatically computing the standard deviation of a set of numerical values.

Another object of the invention is to provide an analog computer utilizing known squaring circuit devices in combination with other devices in a novel circuit arrangement to compute the standard deviation of any given number of numerical values.

Other objects of the invention and many attendant advantages of the invention will become readily apparent as the same becomes better understood from the following detailed description when considered in conjunction with the accompanying drawings wherein:

Fig. 1 is a schematic diagram of one form of a basic computer circuit, constructed in accordance with the principles of the invention, utilizing the dynamometer principle, and Fig. 2 is a schematic diagram of a modification of the computer circuit of the invention utilizing the thermocouple principle.

Any known type of physical transducers may be used to practice the invention providing the output of each can be made proportional to the square of a current. Specifically, the transducer elements described herein are based on (1) the dynamometer principle and (2) the thermocouple principle.

The physical concepts used in the dynamometer follow. The torque T developed in a solenoid carrying a current $i$ in a magnetic field B whose flux lines are perpendicular to the flux lines due to the solenoid, is $T = k_1 iB$, where the constant $k_1$ depends on the geometry of the solenoid. If the field B is produced by another solenoid carrying the same current $i$, $B = k_2 i$, where here the constant $k_2$ depends on the geometry of the solenoid system. Combining the above two equations $T = k_1 k_2 i^2$. Thus, this torque is seen to be proportional to the square of a current where the proportionality constant is $(k_1 k_2)$.

Over a limited temperature range the voltage developed in a thermocouple is proportional to the temperature difference of the junctions. This temperature difference for any given heat capacity is proportional to the heat causing this temperature difference. In the case where the heat is a result of the heating of a wire, the voltage for a given wire resistance is proportional to the square of the current in the wire since the joule heat equals the resistance times the square of the current. Thus, this thermocouple voltage is a second possible physical quantity.

Given a set of numerical values or their current equivalents $i_k$, the computer of the invention automatically computes the standard deviation current equivalent $i_{sd}$, and thus, the numerical value of the standard deviation. The formula for the standard deviation S.D. of $n$ numerical values $X_k$ is:

$$S.D. = \sqrt{\frac{\sum_{k=1}^{n} X_k^2}{n} - \left[\frac{\sum_{k=1}^{n} X_k}{n}\right]^2}$$

Since all the current equivalents are related to their respective numerical values by a common conversion factor, the formula for the standard deviation in terms of current equivalents is:

$$i_{sd} = \sqrt{\frac{\sum_{k=1}^{n} i_k^2}{n} - \left[\frac{\sum_{k=1}^{n} i_k}{n}\right]^2}$$

The circuits for computing the standard deviation of a possible number of numerical values up to three are illustrated in Figs. 1 and 2. The extension of these circuits for possible numbers of input numerical values greater than three will be readily apparent. Referring to Fig. 1, five substantially identical dynamometer units 11, 13, 15, 17 and 19 are shown.

The five substantially identical dynamometer units 11, 13, 15, 17 and 19 are of the d'Arsonval movement type of construction. Each one consists of a stationary or stator winding wound upon a magnetic core structure, 81, 83, 85, 87 and 88, respectively, and a rotor winding so mounted that its axis is at right angles to the flux due to the stator winding having its connection to the external circuit at both its ends by flexible pigtails or other means allowing relative rotation of the rotor with respect to the stator structure. The rotor windings are mounted upon a common shaft in such a manner that each rotor winding is located in an air gap of the magnetic core structure and thus within the magnetic field produced by its associated stator winding. As shown, the five rotor windings 21, 23, 25, 27 and 29, are all mounted on a common shaft 31 which also carries pointer 33. The pointer 33 cooperates with a scale 35 having a center line to indicate a null position.

The input system for the dynamometer unit 11 will now be described. The dynamometer unit 11 has a stator winding 41 wound upon a magnetic core structure 81. The stator winding 41 is equipped with taps 42, 43 and 44, which cooperate with a switch arm 45 so as to put into the circuit respectively all, one-half or one-third of the total number of turns of the stator winding 41. The dynamometer unit 11 is energized from a direct current source represented by the terminals designated by the positive (+) and negative (—) symbols. The switch arm 45 is connected to the positive (+) terminal through an ammeter 46 and a variable resistor 47 having an "off" position stop 48. The end of the stator winding 41, remote from the taps 42, 43 and 44, is connected to one end of the rotor winding 21. The other end of the rotor winding 21 is connected to a line 59 which, in turn, is connected through the stator and rotor windings of the dynamometer 17 to the negative (—) terminal of the direct current source. The coils of the dynamometer unit 17 in series may be shunted by either or both of two resistances 38 and 40, each of which has a resistance equal to the internal resistance of the dynamometer unit 17. A three position switch 49 is provided to put into this shunting circuit either both, one, or none of the two resistances 38 and 40, depending on its operating position. The function of these resistances 38 and 40 will be described later.

The connection of the dynamometer units 13 and 15 is analogous to that of dynamometer unit 11. Dynamometer units 13 and 15 have stator windings 51 and 61 wound upon magnet core structures 83 and 85, respectively. The two stator windings 51 and 61 are each equipped with a set of three taps 52, 53 and 54 for stator winding 51, and a second set of taps 62, 63 and 64 for stator winding 61. The two sets of taps cooperate respectively with switch arm 55 and 65. The dynamometer units 13 and 15 are energized from the same direct current source represented by the positive (+) and negative (−) terminals shown. The switch arms 55 and 65 are connected respectively to the positive (+) terminals through ammeters 56 and 66 and variable resistances 57 and 67 each of which has an "off" position stop, i.e., 58 and 68.

The rotors 23 and 25 of the two dynamometer units 13 and 15 are connected to the common line 59 to which the rotor winding 21 of dynamometer unit 11 is also connected.

The electrical system of the dynamometer unit 19 is connected as follows. The dynamometer unit 19 is energized from the same direct current source represented by the positive (+) and negative (−) terminals shown. The stator winding of dynamometer unit 19 is connected through a variable resistance 90 to the positive (+) terminal. The rotor winding of unit 19 is connected in series with the stator winding of that unit through an ammeter 86 to the negative (−) terminal.

The switch arms 45, 55 and 65 and the switch 49 are ganged to operate simultaneously, as indicated by the dashed line, and are controlled by a common selector knob 89.

A description of the mode of operation of the circuit of Fig. 1 follows. In each dynamometer unit the interaction of the stator and rotor develops a torque. The torques developed on the shaft 31 by the five rotors 21, 23, 25, 27 and 29 are proportional, respectively, to the square of the corresponding currents in these rotors. The resultant torque exerted on the shaft 31 is the scalar sum of the torques exerted by each of the five rotors on the shaft 31, since all the torques are co-linear.

The apparatus computes the $$\left[\frac{\sum_{k=1}^{n} i_k}{n}\right]^2$$

term of the standard deviation equation in the following manner. The torque proportional to the average value of the currents in dynamometer units 11, 13 and 15 indicated by ammeters 46, 56 and 66 is obtained by use of the two resistances 38 and 40 which have values identical with the effective resistance of the average current dynamometer 17. When $n=3$ the dynamometer is shunted by both resistances, one third of the total current flowing through the windings. This average current is squared upon passing through the average current dynamometer unit 17. The result is the above term for $n=3$.

The circuit computes the $$\left[\frac{\sum_{k=1}^{n} i_k^2}{n}\right]$$

term of the standard deviation by dividing by $k$ the flux produced by each stator coil. This is done by the provision of suitable taps for all values of $k$, for example, $k=1$, 2, 3 ... $n$. The case for $n=3$ follows. The stators 41, 51 and 61 of the corresponding numerical value dynamometer units 11, 13 and 15 have taps, so that the selector knob 89 can simultaneously switch into the circuit one-third, one-half, or all of the total number of turns on each of the stators, and correspondingly both, one, or none of the two resistances 38 and 40 for values of $n=3$, 2 and 1, respectively. Thus, three, two or one input currents may be used by setting zero input currents in the remaining none, one, or two of the circuits. This is accomplished by using none, one, or two of the "off" position stops 48, 58 and 68.

The variable resistors 47, 57 and 67 are adjusted to make the currents transmitted through the winding of the dynamometers 11, 13 and 15 respectively, as indicated by the ammeters 46, 56 and 66 in series therewith proportional to different ones of the numerical values to be computed. It will, of course, be apparent that calibrated variable resistors could be used for elements 47, 57 and could thus be eliminated. This also applies to the resistor 87 which adjusts the current through the balancing 67, and that the corresponding current measuring devices current dynamometer 19.

The circuit compensates for the negative values of both the standard deviation, S.D., term and the second term under the radical sign by having the torques developed by the corresponding dynamometer units 17 and 19 directed in the opposite direction to each of the torques developed by the other three dynamometer units 11, 13 and 15. This torque opposition is indicated by the directions of the arrows above the units in Fig. 1.

Since the variable torque exerted by the balancing current dynamometer unit 19 provides the null balance of torques, the variable current adjusted by the corresponding variable resistor 90, as indicated by the corresponding ammeter 86, provides the null balance in current form. This balance current equals the $i_{sd}$ derived above. Thus, the circuit automatically computes $i_{sd}$ and the corresponding numerical value of the standard diviation S.D.

Referring to Fig. 2, five identical thermocouple units 111, 113, 115, 117 and 119 are shown. The five thermocouple units 111, 113, 115, 117 and 119 each have one junction 121, 123, 125, 127 and 129, respectively, attached to the corresponding heater wires 131, 133, 135, 137 and 139, which are all identical. The other junctions 141, 151, 161, 171 and 181, respectively, are maintained at a common reference temperature.

The input system for the thermocouple numerical value unit 111 will now be described. The thermocouple unit 111 is attached to its corresponding heater wire 131, which is energized from a direct current source represented by the terminals designated by the positive (+) and negative (−) symbols. The heater wire 131 is connected to the positive (+) terminal through an ammeter 146 and a variable resistor 147 having an "off" position stop 148. The other end of the heater wire 131 is connected to a common line 159 which, in turn, is connected through the heater wire 137 of the thermocouple unit 117 to the negative (−) terminal. The heater wire 137 of the average current thermocouple unit 117 may be shunted by one or more resistors 138 and 140, each having a resistance equal to the resistance of the heater wire 137. A switch 149 is provided to put into the shunting circuit either both, one, or none of these two resistances 138 and 140.

The connection of each of the numerical value thermocouple units 113 and 115 is analogous to that of the above thermocouple unit 111. Thermocouple units 113 and 115 are each energized from the same direct current source represented by the positive (+) and negative (−) terminals. One end of each of the corresponding heater wires 133 and 135 is connected respectively through ammeters 156 and 166 and variable resistances 157 and 167 having "off" position stops 158 and 168 to the positive (+) terminal. The other ends of the heater wires 133 and 135 each are connected to the common line 159.

The electrical system of the balancing current thermocouple unit 119 is connected as follows. The unit 119 is energized from the same direct current source represented by the positive (+) and negative (−) terminals. One end of the corresponding heater wire 139 is connected through a variable resistance 187 to the positive (+) terminal. The other end of the heater wire 139 leads through an ammeter 186 to the negative (−) terminal.

In each thermocouple unit the heating of the wire and the resultant temperature gradient developed between the thermocouple junctions produces in the thermocouple circuit an E.M.F. whose polarity is indicated by the positive (+) and negative (−) signs.

The positive (+) side of numerical value thermocouple unit 111 is connected through a voltage divider resistance 160 to the negative (−) side of thermocouple unit 115. This resistance 160 is equipped with a set of taps 142, 143 and 144 which cooperates with a switch contact 145 so as to permit the putting into the circuit respectively one-third, one-half, or all of the total E.M.F. developed across this resistance 160. The positive (+) side of the thermocouple unit 115 is connected to the negative (−) side of the thermocouple unit 113. The positive (+) side of the thermocouple unit 113 is connected to the negative (−) side of the thermocouple unit 111. The negative (−) side of the thermocouple unit 115 is connected through resistance 160 to the positive (+) side of the thermocouple unit 111. The positive (+) side of the average thermocouple unit 117 is connected to the negative (−) side of the balancing current thermocouple unit 119. The pivoted end of the switch arm 145 is connected to the negative (−) side of the thermocouple unit 117. The positive (+) side of the thermocouple unit 111 is connected through a null indicator such as a galvanometer 134 to the positive (+) side of the thermocouple unit 119.

The previously referred to switch arm 145 and switch 149 are ganged to operate simultaneously as indicated by the dashed lines and are controlled by a common selector knob 189.

A description of the mode of operation of the circuit of Fig. 2 follows. The E.M.F. developed in each of the five thermocouple circuits due to the heating of the corresponding respective wire is proportional to the square of the current in the respective heater wires. Each E.M.F. thus developed, either adds or subtracts and the null balance total is indicated by a galvanometer 134.

The circuit computes the term $$\left[\frac{\sum_{k=1}^{n}(i_k^2)}{n}\right]$$

of the standard deviation equation by dividing the expression $$\left(\sum_{k=1}^{n}(i_k^2)\right)$$

which represents the total E.M.F. developed by all the thermocouple units corresponding to all those input currents which have values other than zero, by $k$. This is accomplished by the provision of taps for example, all values of $k$, for $k=1, 2, 3 \ldots n$. The case for $n$ 3 follows. The voltage divider resistance 160 has taps 142, 143 and 144 so that the selector knob 153 can simultaneously switch into the circuit one-third, one-half or all of the total voltage developed across the resistance 160, and correspondingly both, one or none of the shunting resistances 138 and 140 for values of $n=3$, 2 and 1, respectively. Thus, three, two or one input currents may be used by setting zero input currents in the remaining respective none, one or two of the circuits by using respectively none, one or two of the "off" position stops 148, 158 and 168.

The average current of the currents in the heater wires 131, 133 and 135 is obtained by the use of the two resistances 138 and 140, each of which has a resistance value identical with the effective resistance of the heater wire 137. The circuit computes the $$\left[\frac{\sum_{k=1}^{n}i_k}{n}\right]^2$$

term of the standard deviation equation in terms of the E.M.F. developed in the average thermocouple unit 117.

The circuit compensates for the negative values of both the standard deviation, S.D., term and the second term under the radical sign by having the E.M.F.'s of the thermocouple units 117 and 119 oppose the sum of the E.M.F.'s of the thermocouple units 111, 113 and 115. Since the E.M.F. necessary to provide a balance, as indicated by the galvanometer 134, is effected by the balancing current thermocouple unit 119, the corresponding current is indicated by the ammeter 186. This balance current which is obtained by regulation of resistance 187 equals the $i_{sd}$ term derived above. Thus, the circuit when in balance automatically computes the $i_{sd}$ term and the corresponding standard deviation, S.D.

It will be apparent that the apparatus as described above constitutes an analogue computer which computes the standard deviation of a plurality of numerical values. The apparatus can be set for any given number of numerical inputs and automatically adjusts its circuit components to perform the required operations for the given inputs.

It will, of course, be apparent to those skilled in the art that the invention may be practiced other than as specifically described above. In the light of the above teachings various equivalent elements may be used to carry out the necessary steps of the computation. It is, therefore, to be understood that the scope of the invention is defined only by the appended claims.

What is claimed is:

1. A device for computing the numerical value of the standard deviation of a given set of numerical values, comprising a plurality of means for respectively establishing electric currents proportional to different ones of the numerical values in each set, the proportionality constant being identical for all of these currents, a plurality of like square law transducers each having an input circuit, means for applying to the input circuit of each of said transducers a different one of the established electric currents thereby producing an output from each transducer proportional to the square of the current in the input circuit of that transducer, means for adding the outputs of said transducers and for adjusting them to make their sum inversely proportional to the total number of numerical values in said set, electrical means responsive to the resultant adjusted sum of the inputs of said transducers to produce a current of value equal to the average of said inputs, two other square law transducers substantially identical with each of the first-mentioned transducers, each having an input circuit, means for applying said average current to the input circuit of the first of said other transducers so as to produce an output therefrom which is proportional to the square of the input current to that transducer, said other transducers being connected in such manner that their outputs add and oppose the sum of the adjusted outputs of said first-mentioned transducers, means in circuit with the second of said other transducers for adjusting the amount of the current therethrough to the value required to balance the sum of the outputs of said first-mentioned transducers and said first transducer and means to indicate the value of the balancing current as a measure of the standard deivation of the numerical values in said set.

2. A device for computing the numerical value of the standard deviation of a given set of numerical values, comprising a source of electric current, a circuit energized from said source, having a plurality of branches each including individual means for adjusting and indicating the value of the current in that branch, and an individual square low numerical value transducer having an input and an output, the adjustment of said individual adjusting means being such that the current in each of said circuit branches is proportional to a different one of the numerical values in said set, the proportionality constant being identical for all of these currents, the output of each of said numerical value transducers being proportional to the square of its input current, the proportionality constant being identical for all of said transducers, means for adding the outputs of said transducers and for adjusting the sum of these outputs so that it is inversely proportional to the total number of numerical values in said set, a common junction for all of said branches carrying the sum of the individual branch currents so adjusted, means for producing a current of a value which is the average of that of the currents in said circuit branches, comprising a plurality of impedance elements and switching means for connecting one or more of said impedance elements in circuit between said common junction and said source of current, the number of said impedances being one less than the number of said circuit branches, two other branch circuits connected to said source of current, each including another square law transducer substantially identical with that in each of the first-mentioned circuit branches, said other transducers being connected so that their outputs add and oppose the sum of the outputs of the numerical value transducers in said first-mentioned circuit branches, the value of each of said impedance elements being equal to the internal impedance of one of said other transducers, means for applying said current of average value to the input of said one transducer so as to produce an output proportional to the square of the input current thereto, the branch circuit including the second of said other transducers also including means for adjusting and indicating the value of the current required to balance the sum of the outputs of said one and said transducers in said first-mentioned circuit branches, the value of this balancing current representing the standard deviation of all the numerical values in said set.

3. A device according to claim 1, wherein each of said plurality of means for respectively establishing electric currents proportional to different ones of the numerical values in said set includes a current measuring device.

4. A device according to claim 1, wherein each of said plurality of means for respectively establishing electric currents proportional to different ones of the numerical values in said set includes a variable impedance with an off position stop and wherein all said square law transducers are energized from the same voltage source.

5. A device according to claim 1, wherein the means in circuit with the second of said other transducers for adjusting and indicating the amount of current required to balance the sum of the outputs of said first-mentioned transducers and said first of said other transducers comprises an adjustable impedance in series therewith, and a null indicator means connected to the circuits connecting the output means of all of said transducers.

6. A device for computing the numerical value of the standard deviation of a given set of numerical values, comprising a plurality of means for establishing electric currents, each of said currents being proportional to a different one of said numerical values, the proportionality constant being identical for all said currents, a plurality of numerical value dynamometer units each having a stator winding and a series connected rotor winding mounted with its axis at right angles to the flux due to the stator winding, means for connecting the windings of each of the said dynamometer units in circuit with a different one of said means for establishing electrical currents thereby causing the rotor winding of each dynamometer unit to develop a torque proportional to the current supplied to its windings, electrical means responsive to the sum of the electric currents in the windings of said dynamometer units produce an average current, an average current dynamometer unit having a stator winding and a series connected rotor winding mounted with its axis at right angles to the flux due to the stator winding, means connecting the electrical means responsive to the sum of said electric currents in circuit with the windings of said average current dynamometer unit, adjustable means for establishing a balancing current, a balancing current dynamometer unit having a stator winding and a series connected rotor winding mounted with its axis at right angles to the flux due to the stator winding, means connecting the said adjustable means for establishing a balancing current in circuit with the windings of the said balancing current dynamometer unit, as common shaft connecting the rotor windings of all the said dynamometer units in such a manner that the torques developed by the rotor windings of the numerical value dynamometer units all add and are opposed by the torques developed by the rotor windings of both the said average current dynamometer unit and the said balancing current dynamometer unit and means to indicate the value of the balancing current through the windings of said balancing current dynamometer unit required to balance the sum of the torques developed by said numerical value dynamometer units and said average current dynamometer unit, the numerical value of this balancing current being proportional to the standard deviation of said set of numerical values.

7. A device according to claim 6, wherein each of said means for establishing electric currents includes a current measuring device.

8. A device according to claim 6, wherein each of said means for establishing electric currents includes a variable impedance with an off position stop and wherein all said dynamometer units are energized from the same voltage source.

9. A device according to claim 6, wherein the adjustable means for establishing a balancing current includes an adjustable impedance and a null indicator comprising a pointer mounted on said common shaft.

10. A device for computing the numerical value of the standard deviation of a given set of input numerical values, comprising a plurality of means for establishing electric currents, each of said currents being proportional to a different one of said numerical values, the proportionality constant being identical for all said currents, a plurality of like numerical value thermocouple units each having a heater wire, one junction attached to its heater wire and a reference junction maintained at a common reference temperture which is the same for all the thermocouple units, the heater wire of each thermocouple unit being connected to a different one of said means for establishing electrical currents, electrical means responsive to the sum of the said electrical currents in the heater wires of said thermocouple units to produce an average current, an average current thermocouple unit having a heater wire, one junction attached to its heater wire and a reference junction maintained at the said common reference temperature, means for applying said average current to the said heater wire of the average current thermocouple unit, a balancing current thermocouple unit having a heater wire, one junction attached to its heater wire and a reference junction maintained at the said reference temperature, adjustable means for establishing a balancing current connected in circuit with said balancing current thermocouple unit, an electrical means responsive to the sum of the E.M.F.'s developed in all said numerical value thermocouple units to establish an average E.M.F. for these units, means connecting all the said thermocouple units in such a manner that said average E.M.F. of the numerical value thermocouple units is opposed by the E.M.F.'s of both the said average current thermocouple unit and the said balancing current thermocouple unit, said adjustable means being adjusted so that the value of the balancing current established thereby is such as to balance the sum of the outputs of said numerical value thermocouple units and said average current thermocouple unit and means for indicating the numerical value of this balancing current which is proportional to the standard deviation of said set of numerical values.

11. A device according to claim 10, wherein the means connecting the heater wire of each of the said numerical value thermocouple units and the said balancing current thermocouple unit includes a current measuring device.

12. A device according to claim 10, wherein the means connecting the heater wire of each of said numerical value thermocouple units includes a variable impedance with an off position stop and wherein all said thermocouple units are energized from the same voltage source.

13. A device according to claim 10, wherein the adjustable means for establishing a balancing current includes an adjustable impedance, and a null indicator connected across all of said thermocouple units.

14. A device according to claim 10, wherein the said electrical means responsive to the sum of the E.M.F.'s in all said numerical value thermocouple units to establish an average E.M.F. of the input numerical value thermocouple units and the said electrical means responsive to the sum of the said electrical currents to establish an average current in both cases include resistance with an associated set of taps, and a common selector knob cooperating with both sets of taps.

References Cited in the file of this patent
UNITED STATES PATENTS 2,496,674     Omberg _____ Feb. 7, 1950

OTHER REFERENCES

Electronic Analog Computers (Korn and Korn), published by McGraw-Hill Book Co., New York, 1952, pages 217 and 218.